July 30, 1963 — A. HONKANEN — 3,099,045
METHOD AND APPARATUS FOR MOLDING PRE-EXPANDED PLASTIC BEADS
Filed June 1, 1960
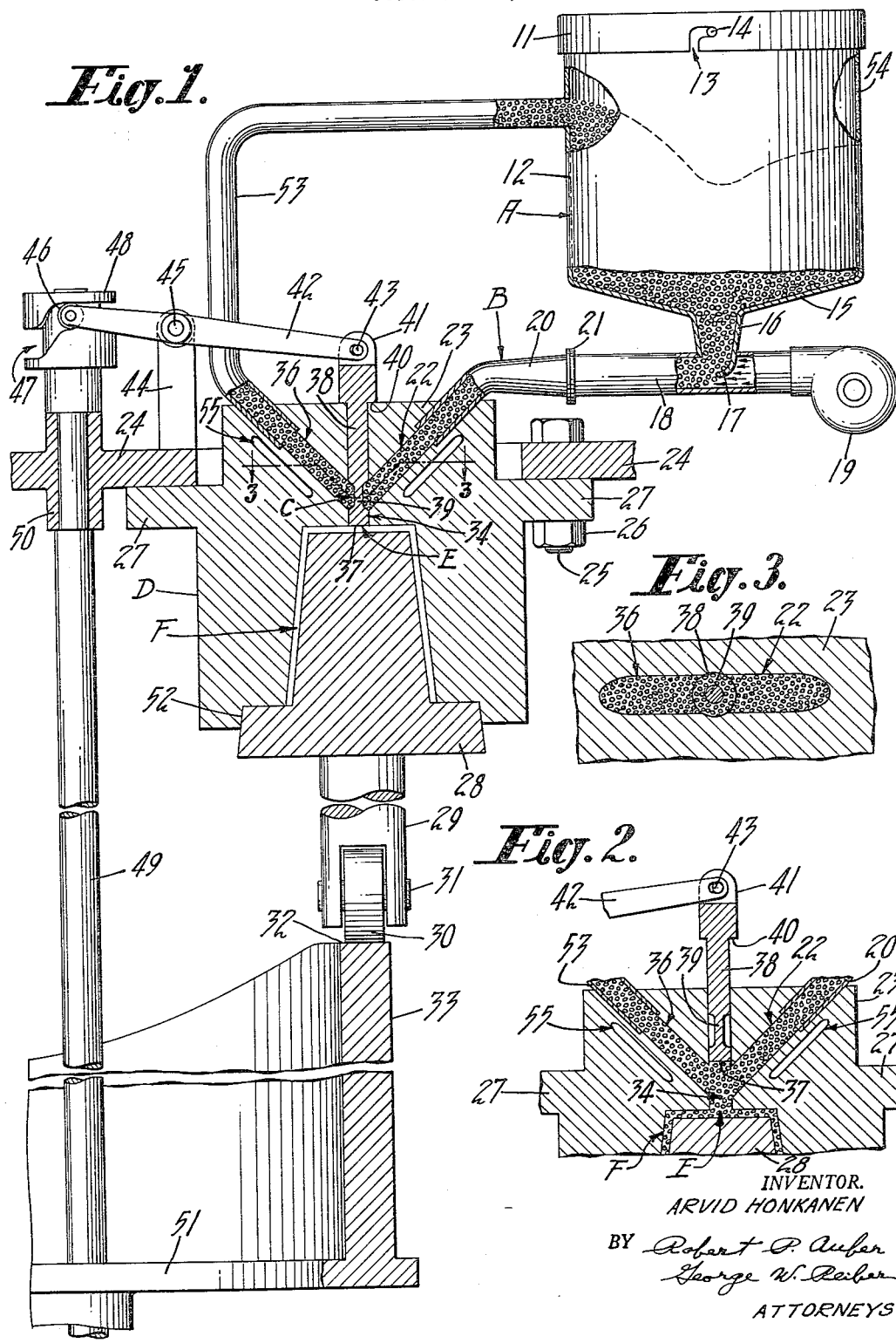
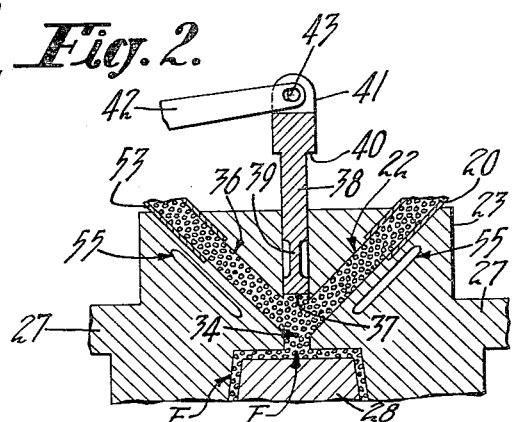
INVENTOR.
ARVID HONKANEN
BY Robert P. Auber
George W. Reiber
ATTORNEYS 3,099,045
METHOD AND APPARATUS FOR MOLDING PRE-EXPANDED PLASTIC BEADS
Arvid Honkanen, Belvidere, Ill., assignor to American Can Company, New York, N.Y., a corporation of New Jersey
Filed June 1, 1960, Ser. No. 33,328
17 Claims. (Cl. 18—30)

The present invention pertains to an apparatus for molding cellular thermoplastic articles, and more particularly to a novel means for conveying pre-expanded hollow plastic beads to and into a mold cavity where they are molded into articles having a closed cell, cellular strutcure.

The preferred method of molding articles from foamable plastics requires that the plastic articles be initially pre-expanded into small multicellular beads and the cellular plastic beads so formed used as the molding material. Such pre-expanded beads may be prepared by heating small particles of thermoplastic substances containing an expanding or blowing agent to a temperature at which simultaneously the plastic is softened and the blowing agent within each individual particle forms a gas. The pressure of the gas formed within each particle expands the plastic without rupturing the outer wall producing a multiplicity of individual, low density beads or spheroids. This heating may be carried out by any suitable means which produces a temperature above the boiling point of the blowing agent and above the softening point of the plastic. To prevent their fusion or coalescence, the beads must be maintained substantially separate and free of compacting pressure during the pre-expansion process, or heated by a medium such as steam or hot salt solution which inhibits the agglomeration of the expanded beads.

Placing a quantity of the cellular beads in a mold and heating causes them to coalesce with some additional expansion into a cellular mass conforming to the mold cavity shape and having a closed cell structure. This method has the advantage over the method wherein the complete foaming process takes place in the mold in that the molding time is considerably shortened. Furthermore, where it is desirable to have beads of substantially uniform size it can be accomplished by initially grading the pre-expanded beads according to size and using beads of a uniform size as the molding material.

In molding articles using pre-expanded beads, however, it is necessary that the mold be completely filled with beads initially, which presents problems with regard to the measurement of the proper amount of beads and their insertion into the mold cavity. This problem is especially acute where a high rate of production is required in order to make utilization of the process economically feasible, because the total cycle time required for measurement, insertion, heating and cooling may be too long. Since the heating and cooling times are not easily speeded up due to the insulative properties of the expanded material, it is necessary to reduce to a minimum the time required to measure and insert the proper amount of beads into the mold cavity.

An object of the present invention is to provide an apparatus for molding pre-expanded plastic beads into articles having a uniform closed cell structure which will overcome the problems hereinbefore pointed out.

Another object is to provide such an apparatus whereby insertion of the proper amount of plastic beads to completely fill the mold cavity is quickly and effectively accomplished.

A further object is to provide such an apparatus which is suitable for automatic high speed production.

Yet another object is to provide an apparatus for the purpose described which is simple in construction and operation and has a minimum of moving parts.

Still a further object is to provide a method of conveying pre-expanded plastic beads to and into a mold cavity which is simple and rapidly performed.

Numerous other objects and advantages of the invention will be apparent as it is better understood from the following description, which, taken in connection with the accompanying drawings, discloses a preferred embodiment thereof.

Referring to the drawings:

FIGURE 1 is an elevational view of an apparatus embodying features of the present invention, with portions broken away to show details of the structure;

FIG. 2 is a fragmentary view showing the vave in the position for filling the mold cavity;

FIG. 3 is a sectional view taken substantially along line 3—3 of FIG. 1.

The present invention consists of a hopper or reservoir A containing pre-expanded thermoplastic beads and having an opening feeding into a closed, continuous, pressurized, air conveying system B which transports the beads to a two-position valve C integral with one section of a two-section mold D. In the open position, the valve C allows the pressurized stream of air and beads to pass through an opening E into the mold cavity F and deposit the beads therein, the air escaping through the mold parting line. After the mold cavity F is completely filled, the valve C permits the continuously flowing stream of air and beads to be reconveyed by means of the conveyor system B back to the hopper A. In the closed position, valve C closes the opening E and by-passes the continuously flowing stream of air and beads back into the conveyor system B and thence back into the hopper A.

In the preferred or exemplary embodiment of the instant invention shown in FIG. 1, the hopper A, preferably cylindrical in shape though a rectangular or other form would be suitable, has a cover 11 closing the open upper end of a body 12. The cover 11 is held in place by any suitable means such as a plurality of conventional bayonet slots 13 (only one shown) in the dependent skirt portion of the cover 11 coacting with pins 14 integral with the body 12. The cover 11 may be easily removed to renew the supply of beads in the hopper A as required.

The lower end of the hopper A is shaped into a downwardly and inwardly inclined bottom 15 terminating in a downwardly extending feed pipe 16. The feed pipe 16 communicates with the conveying system B whereby the pre-expanded plastic beads which are placed in the hopper A pass by gravity through the feed pipe and into the conveying system. An elongated portion or extension 17 of the feed pipe 16 extends downwardly into a supply duct 18 which is part of the system B. The extension 17 is initially substantially perpendicular to the longitudinal axis of the supply duct 18 and then curves over the opening in the feed pipe 16 to terminate substantially along the longitudinal axis of the supply duct 18.

A blower 19 connected to the end of the supply duct 18 adjacent the elongated portion 17 exhausts air into the duct 18 and thereby into the entire conveying system B.

Because of its safety, availability and cheapness, air is preferred as the conveying gas. However, other gases may be used if desired. This air, flowing at a rapid rate past the feed pipe 16, entrains the beads passing down from the hopper A and conveys them through the system B.

Some form of shielding is desirable to direct the air past the feed pipe 16 into the conveyor system B, and minimize its tendency to flow directly up into the hopper A. This shielding may be in the form of a deflector vane placed in the supply duct 18 adjacent to and upstream from the opening in the feed pipe 16, with the vane being inclined over the feed pipe opening. In the preferred embodiment shown in FIG. 1, this shield is comprised of the feed pipe extension 17 as hereinbefore described. This form has an additional advantage in that the air in the supply duct 18 is accelerated when it flows past the restriction formed by the extension 17 and consequently exerts an aspirating action on the air and beads in the feed pipe 16. This promotes the steady flow of beads from the hopper A into the duct 18 without the need for special devices such as an agitator in the hopper A.

The end of the supply duct 18 remote from the blower 19 is connected to an inlet duct 20 by means of a flanged or other suitable connection 21. The inlet duct 20 leads to an inlet port 22 in the fixed top mold section 23 of the two-section mold D. The fixed mold section 23 is secured to the frame 24 by means of bolts 25 and nuts 26, the bolts 25 passing through the frame 24 and a mounting flange 27 integral with the fixed mold section 23.

The two-section mold D has a movable lower mold section 28 mounted on a column 29. The column 29 is slidably mounted in the frame 24 so as to be free to move in the vertical direction and has a roller 30 attached to its lower end by means of a pin 31. The roller 30 rolls along the cam surface 32 of a crown cam 33. As the crown cam 33 is rotated, the roller 30 following the cam surface 32 raises and lowers the column 29 and movable mold section 28. As shown in FIG. 1 the movable mold section 28 is in the uppermost position engaging the fixed mold section 23 to form the mold cavity F of desired configuration. The mold cavity F as shown in the drawing produces a thin-walled tapered cup.

Extending vertically through and centrally located in the fixed mold section 23 is a hole or bore 34 (FIG. 2) which communicates with the mold cavity F through the mold opening E. The hole 34, adjacent the opening E, also communicates on one side with the inlet port 22 and on the other side with an outlet port 36 each extending downwardly through the fixed mold section 23 and angularly inwardly towards the hole 34. Mounted in the hole 34 and vertically slidable therein is the two-position valve C.

As shown in FIG. 1, the valve C is in the closed or by-pass position wherein its bottom face 37 closes the mold opening E. The stem 38 of the valve has a reduced diameter portion 39, which when the valve is in its closed position, is located between the inlet port 22 and outlet port 36 so as to permit the continuous stream of air and entrained beads to flow from the inlet port, around the reduced diameter portion 39 and into the outlet port.

The upper portion of the valve stem 38 is enlarged providing the shoulders 40 which abut against the upper surface of the fixed mold section 23 to limit the downward throw of the valve C so that the bottom face 37 is in its desired, closed position, such as in alignment with the surface of the fixed mold section 23 defining the mold cavity F.

Connected to the uppermost end 41 of the valve stem 38 is an oscillatable lever 42. Lever 42 is pivotally connected to the end 41 by means of a pin 43 extending through the end 41. Intermediate its ends, the lever 42 is pivotally attached to a pedestal 44 by means of a pin 45. The lower end of the pedestal 44 is integral with the frame 24. Rotatably attached to the end of the lever 42 remote from the pin 43 is a roller follower 46 which travels within a cam groove 47 located in a covered crown cam 48. The cam 48 is rigidly attached to the upper end of a main drive shaft 49 which extends downwardly through a bearing 50 rigidly attached to the frame 24, through the base 51 of the crown cam 33 to which it is rigidly attached and thence to a suitable source of motive power such as a motor (not shown).

The interconnected cam, shaft and lever arrangements previously described are for the purpose of operating the opening and closing of the mold D and valve C in timed relationships. It is to be understood that other suitable arrangements could be used to accomplish the same result. In the exemplary embodiment illustrated, cams 33 and 48 rotate in unison under the impetus of the drive shaft 49. In FIG. 1, the movable mold section 28 has just reached its uppermost mold closing position by virtue of the roller 30 having just reached the high portion of the cam 33 where the roller 30 will remain for a pre-determined dwell time. Immediately thereafter, the roller follower 46 reaches the lowest portion of the cam groove 47, thereby causing the lever 42 to oscillate (counter-clockwise as shown in the drawing) which raises the valve stem 38 and opens the valve C.

The angle between the inlet port 22 and the outlet port 36 is much sharper than the angle between the inlet port 22 and the mold opening E. Consequently, when the valve C is open, the flow of air and beads will be through the mold opening E and into the mold cavity F rather than into the outlet port 36. The air carrying the plastic beads into the mold cavity F is permitted to escape through the mold parting line 52 which is left open a slight amount for this purpose. A gap opening 52 of .005" is generally sufficient to permit the air to escape without producing an undesirable flashing on the molded article.

The cam 48 holds the valve C in the open position for a period of time sufficient to insure that the mold cavity F will be completely filled. As soon as the mold cavity is filled, and while the valve is still in the open position, the stream of air and entrained beads being unable to enter the filled mold cavity is forced to pass into the outlet port 36, as shown in FIG. 2. The roller 46 is then directed upwardly by the groove 47 of the cam 48 which causes the lever 42 to oscillate (clockwise as shown) depressing the valve stem 38 and closing the valve C. When the valve C is closed, the continuous stream of air and beads flows from the inlet port 22 around the reduced diameter portion 39 of the valve stem 38 and into the outlet port 36, as shown in FIG. 1.

The air and beads which flow into the outlet port 36 in either position of the valve C are conveyed back to the hopper A by means of a return duct 53 which connects the outlet port 36 to an opening in the hopper body 12 adjacent the cover 11. The pressurized air entering the hopper A is vented out through a screened vent opening 54 in the hopper body 12 adjacent the cover 11, the beads being retained within the hopper by the screen.

Each section of the mold is provided with heating and cooling jackets (not shown) in the manner well known in the art through which steam or water is passed to expand and set the plastic beads within the mold cavity F. The pressurized air which continues to flow through the inlet port 22 and outlet port 36, and past the valve stem 38 during the portion of the cycle in which the mold cavity F is being heated cools the surfaces with which the flowing plastic beads come in contact and thus prevents undue softening and possible premature coalescence of the beads in these passages. For plastics requiring higher molding temperatures, it may be desirable to provide a cooling jacket 55 in the fixed mold section 23 between the mold cavity F and the inlet and outlet ports 22 and 36. Passing water through the cooling jacket 55 minimizes the heating of the continuously flowing plastic beads and insures that premature coalescence will not occur.

The roller 30 dwells on the high portion of the cam 33 to maintain the mold D in the closed position for the portions of the cycle which include the filling of the mold cavity with plastic beads, application of heat to the mold sections 23 and 28 to coalesce the beads, and cooling of the mold to set the plastic into a rigid, unitary article conforming to the mold cavity shape. Immediately thereafter, due to a downward inclination of the cam surface 32 on which the roller 30 travels and because of the weight of the movable mold section 28, the movable mold section separates from the top fixed mold section 23 permitting the molded article to be removed. Removal of the article may be performed manually for semi-automatic operation, or by means of one of the mold stripping devices well known in the art for fully automatic operation. An inclined portion of the cam 33 then raises the roller 30 and movable mold section 28 to the high portion of the cam to repeat the cycle.

It can be seen that the apparatus described will be very advantageous for the high speed molding of thermoplastic articles from pre-expanded beads to produce a closed-cell, cellular structure. The novel means provided for continuously conveying the plastic beads to and into the mold cavity insures that the mold will always be filled with the proper amount of plastic bead and reduces to a minimum the time required for the mold filling operation. Since the utility of the process of molding pre-expanded plastic beads depends in many cases on whether the total cycle time can be reduced to a period which is economically practicable and since the heating and cooling times are not easily speeded up due to the inherent insulative properties of the expanded material, the reduction in mold filling time achieved by the use of the subject process is of decisive importance.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof:

I claim:

1. An apparatus for pneumatically depositing a charge of low density foamed plastic beads in a mold cavity comprising, a mold having a mold cavity therein, a hole in said mold communicating with said cavity, an inlet conduit and an outlet conduit extending through said mold at an angle to said hole and to each other, said conduits each communicating with said hole adjacent said cavity, a supply duct connected to said inlet conduit, a reservoir for holding a supply of said beads and having a feed pipe disposed on the bottom thereof extending into said supply duct, blower means connected to said supply duct for providing a moving gas therein, said gas flowing past said feed pipe to entrain the beads passing downwardly from said reservoir and transporting said beads towards said mold, a return duct connecting said outlet conduit and said reservoir, and movable valve means disposed in said hole, said valve means in one position sealing said cavity from communication with said conduits while simultaneously forming a flow path between said conduits through said hole and in a second position connecting said conduits to said cavity and to each other through said hole, the turning angle of the flow path between said conduits being much greater and thereby presenting a greater flow resistance than the turning angle of the flow path between said inlet conduit and said hole whereby in said second position of said valve means, said gas and beads flow primarily into said cavity until it is fully charged, said gas and beads then automatically flowing into said outlet conduit and thence back to said reservoir.

2. A method of pneumatically depositing a full charge of plastic particles in a mold cavity comprising the steps of, flowing a pressurized gas stream along a main flow path at a high velocity, feeding plastic particles from a storage reservoir into said gas stream, entraining said plastic particles in said gas stream thereby carrying said plastic particles along said main flow path, joining said main flow path as a common juncture to first and second alternate flow paths leading back to said reservoir and into said mold cavity respectively, providing a resistance to the flow of said gas stream and entrained particles from said main flow path into said first alternate flow path, providing a substantially smaller resistance to the flow of said gas stream and entrained particles from said main flow path into said second alternate flow path as compared to the flow resistance into said first alternate flow path whereby said gas stream and entrained particles automatically flow primarily into said second flow path and into said mold cavity, flowing said gas stream through said mold cavity and immediately thereupon venting the gas directly to the atmosphere while retaining and depositing said entrained plastic particles in said mold cavity, agitating said deposited plastic particles in said mold cavity by said gas stream flowing therethrough to uniformly and completely distribute the particles throughout all portions of said mold cavity until said cavity is uniformly and fully charged with said plastic particles, and immediately and automatically thereupon flowing said gas stream and entrained particles into said first flow path to carry said entrained plastic particles back to said reservoir.

3. The method set forth in claim 2 wherein the feeding of said plastic particles from said reservoir is accomplished in part by an aspirating action exerted on said particles by said gas stream thereby promoting the steady flow of said particles into said gas stream.

4. The apparatus set forth in claim 1 wherein said mold comprises a fixed concave member and a movable convex member defining said mold cavity therebetween when in a closed position.

5. The apparatus set forth in claim 4 wherein said movable convex member is reciprocatable toward and away from said fixed concave member.

6. The apparatus set forth in claim 4 wherein said hole and conduits are in said fixed concave member.

7. The apparatus set forth in claim 6 wherein said hole is a vertically extending bore through said concave member in the center thereof.

8. The apparatus set forth in claim 7 wherein said valve means comprises a plug reciprocatable in said bore.

9. The apparatus set forth in claim 8 wherein the upper and lower portions of said plug fill the contiguous portions of said bore sealing said bore portions against escape of said beads therethrough.

10. The apparatus set forth in claim 9 wherein said plug intermediate said upper and lower portions has a reduced cross section to provide a connection between said conduits when said valve is in said second position.

11. The apparatus set forth in claim 7 wherein said conduits extend through said concave member at an angle to said bore, one on each side of said bore.

12. The apparatus set forth in claim 8 wherein said angle is an acute angle.

13. The apparatus set forth in claim 1 wherein said reservoir has an opening in its upper end for the return of unused beads from said ducts into said reservoir.

14. The apparatus set forth in claim 1 wherein said feed pipe has an elongated portion extending substantially to the center of said supply duct, said elongated portion being located on the upstream side of said feed pipe and curving in the direction of the gas flow whereby the gas flowing past the restriction thus formed exerts an aspirating action on the beads promoting the steady flow of said beads from said reservoir into said duct.

15. The method set forth in claim 2 wherein said plastic particles are low density foamed plastic beads.

16. The method set forth in claim 15 wherein said plastic is polystyrene.

17. The method set forth in claim 2 wherein said pressurized gas is compressed air.

References Cited in the file of this patent

UNITED STATES PATENTS

| | | |
|---|---|---|
| 856,026 | Brown | June 4, 1907 |
| 2,398,318 | MacMillin | Apr. 9, 1946 |
| 2,486,346 | Wachs | Oct. 25, 1949 |
| 2,580,581 | Niemitz | Jan. 1, 1952 |
| 2,688,518 | Krenke | Sept. 7, 1954 |
| 2,803,043 | Stephens | Aug. 20, 1957 |
| 2,934,632 | Todd | Apr. 26, 1960 |
| 2,951,260 | Harrison et al. | Sept. 6, 1960 |